United States Patent [19]

Nutting

[11] Patent Number: 5,316,356
[45] Date of Patent: May 31, 1994

[54] GAME DRAGGING DEVICE

[76] Inventor: Frederick S. Nutting, 2 Maplecroft St., Greenville, S.C. 29609

[21] Appl. No.: 55,317
[22] Filed: May 3, 1993
[51] Int. Cl.⁵ ...................... B66C 1/58; A01K 29/00
[52] U.S. Cl. .................... 294/118; 294/117; 119/807
[58] Field of Search ............... 294/16, 111, 117, 118, 294/119, 164; 119/135, 151, 153, 154

[56] References Cited

U.S. PATENT DOCUMENTS

| D. 312,164 | 11/1990 | Perotti | D34/28 |
|---|---|---|---|
| 730,408 | 6/1903 | Skinner | 294/118 |
| 1,236,276 | 8/1917 | Deutschman | 294/118 X |
| 2,595,432 | 5/1952 | Wendt | 294/118 X |
| 2,653,574 | 9/1953 | Spencer | 294/118 X |
| 2,708,768 | 5/1955 | Baim | 119/154 X |
| 3,612,597 | 10/1971 | Wirkkala | 294/118 X |
| 3,752,525 | 8/1973 | Hanna et al. | 294/74 |
| 4,000,576 | 1/1977 | Jones | 294/118 X |
| 4,093,298 | 6/1978 | Gatewood | 294/118 |
| 4,243,164 | 1/1981 | Burlison et al. | 224/52 |
| 4,601,505 | 7/1986 | Chilton | 294/26 |
| 4,741,283 | 5/1988 | Conner | 294/118 X |
| 5,029,921 | 7/1991 | Houghton et al. | 294/26 |

*Primary Examiner*—David M. Mitchell
*Assistant Examiner*—Dean J. Kramer
*Attorney, Agent, or Firm*—Rhodes & Ascolillo; Robert A. Shack

[57] ABSTRACT

A game dragging device for attaching to a fallen game animal to thereby facilitate the dragging of the animal, the game dragging device including a pair of tongs for securing to the animal, the pair of tongs including a first tong member and a second tong member, each of the first and second tong members having a proximate end and a distal end, the first and second tong members being pivotally attached together at a point between the proximate and distal ends thereof, a pair of cables, one end of each of the pair of cables being attached to one each of the proximate ends of the first and second tong members, each of the distal ends of the first and second tong members preferably having a V-shaped edge portion provided thereon, each of the first and second tong members being at least partially S-shaped, a ring member encircling both of the pair of cables, the ring member being slidable along the pair of cables to a point adjacent the pair of tongs, and a pair of grips, one each of the pair of grips being attached to the other end of one each of the pair of cables, each of the grips including a loop formed at each other end of each of the cables, a tubular member encircling each of the cables within each of the loops, and a clamping ring clamping each the other end of each of the cables to thereby form the loops, and each of the proximate ends of the first and second tong members being provided with a throughgoing hole, each one end of the cables passing through one each of the throughgoing holes.

10 Claims, 3 Drawing Sheets

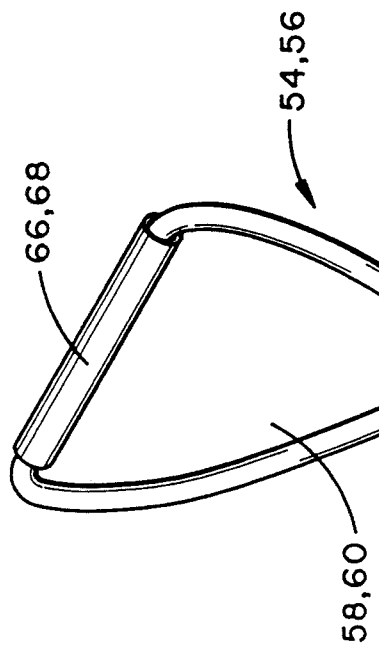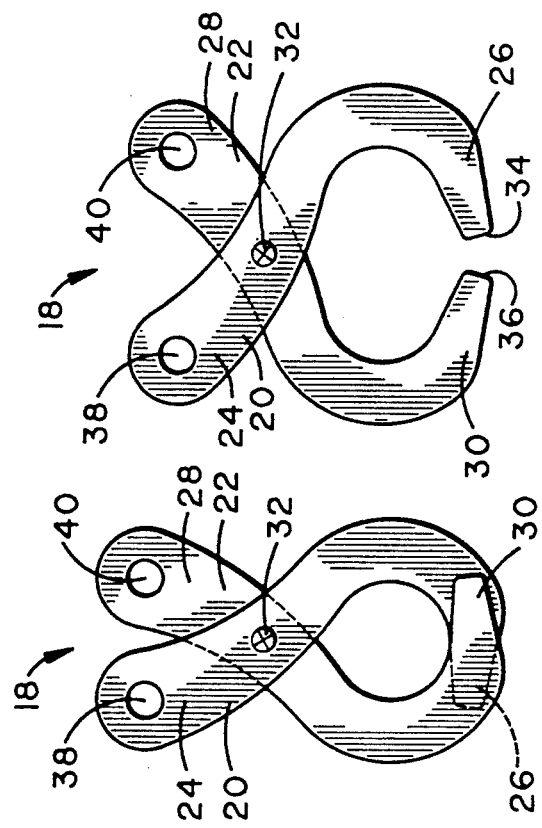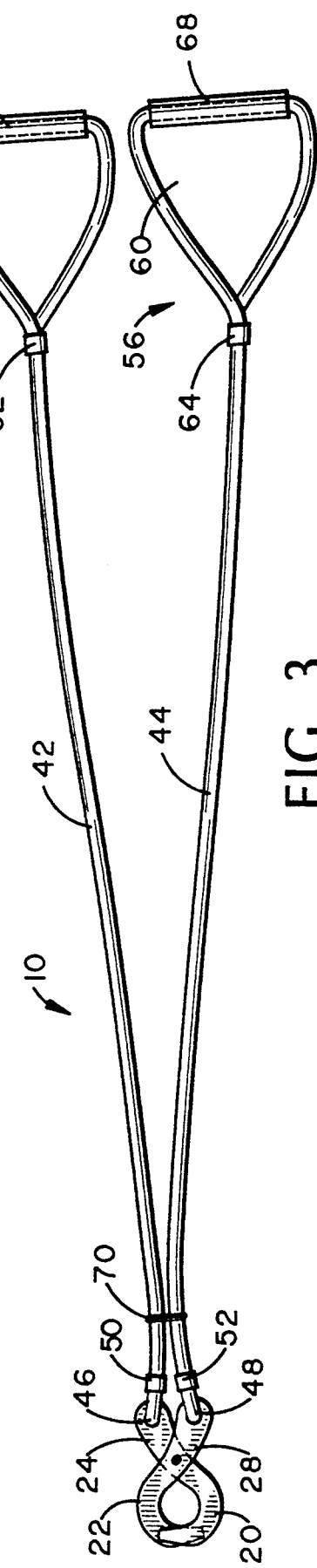

GAME DRAGGING DEVICE

BACKGROUND

1. Field of the Invention

The present invention relates to an apparatus for facilitating the dragging of a fallen game animal, most particularly a deer.

2. Description of the Related Art

U.S. Pat. No. 5,029,921 relates to a deer hauling device that includes a handle in the form of an elongated ellipse, a shank attached to the handle, and an inwardly turned hook provided at the other end of the shank, the axis of the shank being offset from the central axis of the handle in order to distribute the weight evenly across the palm of the user.

U.S. Pat. No. 3,752,525 discloses a deer dragging and tagging device that includes a pair of flared outer sleeves slidably mounted over a cylindrical inner sleeve. The ends of a tow line, having a "chocker" member provided thereon, are attached to the outer ends of the outer sleeves, and the inner sleeve provides space for storing a pencil, a tag, and a pin for securing the tag to the ear of a deer.

U.S. Pat. No. 4,243,164 relates to a game dragging apparatus that includes a rigid bar having a pair of spaced clamp loops thereon that can be secured to the front legs of an animal. A loop that dangles from the central portion of the bar can be looped over the head of the animal to prevent it from dragging on the ground.

U.S. Pat. No. Des. 312,164 discloses a design for a deer dragging instrument that includes a cylindrical bar grip and a Y-shaped cord extending therefrom, the arms of the Y-shaped cord being attached to the ends of the bar, and the leg of the Y-shaped cord being provided with a loop on the distant end thereof.

Finally, U.S. Pat. No. 4,601,505 relates to an industrial safety pull hook that includes a rod bent to form an oval handle, a shank extending therefrom, and a reversely bent hook at the end of the shank. A spring biased closure latch is also provided for preventing disengagement of the hook from an object engaged thereby.

SUMMARY OF THE INVENTION

In one aspect, the invention generally features a game dragging device for attaching to a fallen game animal to thereby facilitate the dragging of the animal, the game dragging device including: a pair of tongs for securing to the animal, the pair of tongs including a first tong member and a second tong member, each of the first and second tong members having a proximate end and a distal end, the first and second tong members being pivotally attached together at a point between the proximate and distal ends thereof; and a pair of cables, one end of each of the pair of cables being attached to one each of the proximate ends of the first and second tong members.

Preferably, each of the distal ends of the first and second tong members has a V-shaped edge portion provided thereon; each of the first and second tong members is at least partially S-shaped; the game dragging device additionally includes a pair of grips, one each of the pair of grips being attached to the other end of one each of the pair of cables; the game dragging device additionally includes a retainer apparatus for retaining the proximate ends of the first and second tong members substantially together; the retaining apparatus includes a ring member, the ring member encircling both of the cables and being slidable thereon; each of the grips includes a loop formed at each other end of each of the cables, a tubular member encircling each of the cables within each of the loops, and a clamping ring clamping each other end of each of the cables to thereby form the loops; each of the proximate ends of the first and second tong members is provided with a throughgoing hole, each one end of the cables passing through one each of the throughgoing holes; each one end of the cables includes an additional loop and an additional clamping ring forming the additional loop, one each of the additional loops passing through one each of the throughgoing holes; and the first and second tong members are constructed from twelve gauge material, the cables are nylon cord, and each of the tubular members is polyvinylchloride pipe.

In another aspect, the invention generally features a game dragging device for attaching to a fallen game animal to thereby facilitate the dragging of the animal, the game dragging device including: a pair of tongs for securing to the animal, the pair of tongs including a first tong member and a second tong member, each of the first and second tong members having a proximate end and a distal end, the first and second tong members being pivotally attached together at a point between the proximate and distal ends thereof; a pair of cables, one end of each of the pair of cables being attached to one each of the proximate ends of the first and second tong members; each of the distal ends of the first and second tong members having a V-shaped edge portion provided thereon; each of the first and second tong members being at least partially S-shaped; a ring member encircling both of the pair of cables, the ring member being slidable along the pair of cables to a point adjacent the pair of tongs; and a pair of grips, one each of the pair of grips being attached to the other end of one each of the pair of cables; each of the grips including a loop formed at each other end of each of the cables, a tubular member encircling each of the cables within each of the loops, and a clamping ring clamping each the other end of each of the cables to thereby form the loops; and each of the proximate ends of the first and second tong members being provided with a throughgoing hole, each one end of the cables passing through one each of the throughgoing holes.

Preferably, each one end of the cables includes an additional loop and an additional clamping ring forming the additional loop, one each of the additional loops passing through one each of the throughgoing holes; and the first and second tong members are constructed from twelve gauge material, the cables are nylon cord, and each of the tubular members is polyvinylchloride pipe.

In yet another aspect, the invention generally features a game dragging device for attaching to a fallen game animal to thereby facilitate the dragging of the animal, the game dragging device including: a pair of tongs for securing to the animal, the pair of tongs including a first tong member and a second tong member, each of the first and second tong members having a proximate end and a distal end, the first and second tong members being pivotally attached together at a point between the proximate and distal ends thereof; a pair of cables, one end of each of the pair of cables being attached to one each of the proximate ends of the first and second tong members; each of the distal ends of the first and second tong members having a V-shaped edge portion provided thereon; each of the first and second tong members being at least partially S-shaped; a ring member encircling both of the pair of cables, the ring member being slidable along the pair of cables to a point adjacent the pair of tongs; and a pair of grips, one each of the pair of grips being attached to the other end of one each of the pair of cables; each of the grips including a loop formed at each other end of the cables, a tubular member encircling each of the cables within each of the loops, and a clamping ring clamping each other end of each of the cables to thereby form the loops; each of the proximate ends of the first and second tong members being provided with a throughgoing hole, each one end of the cables passing through one each of the throughgoing holes; and each one end of the cables including an additional loop and an additional clamping ring forming the additional loop, one each of the additional loops passing through one each of the throughgoing holes.

Preferably, the first and second tong members are constructed from twelve gauge material, the cables are nylon cord, and each of the tubular members is polyvinylchloride pipe.

One object of the present invention is the provision of a game dragging device that is light, compact and yet quite effective, inasmuch as it permits one hunter (or a pair of hunters) to drag a fallen deer with little effort.

Another object of the invention is the provision of such a device that is simple in its construction and operation and, therefore, inexpensive to manufacture.

A still further object of the invention is the provision of a game dragging device that is reliable and that will not slip once engaged.

The invention will now be described by way of a particularly preferred embodiment, reference being made to the accompanying drawings, wherein:

BRIEF DESCRIPTION OF THE DRAWINGS

FIG. 3 is a top plan view of a game dragging device according to the invention;

FIG. 4 is a perspective view of one of the grips of the inventive game dragging device;

FIG. 5 is an elevational view of the tongs of the game dragging device, showing the tongs in a closed configuration; and FIG. 6 is an elevational view of the tongs in an open configuration.

DESCRIPTION OF THE PREFERRED EMBODIMENT

Figure 1:
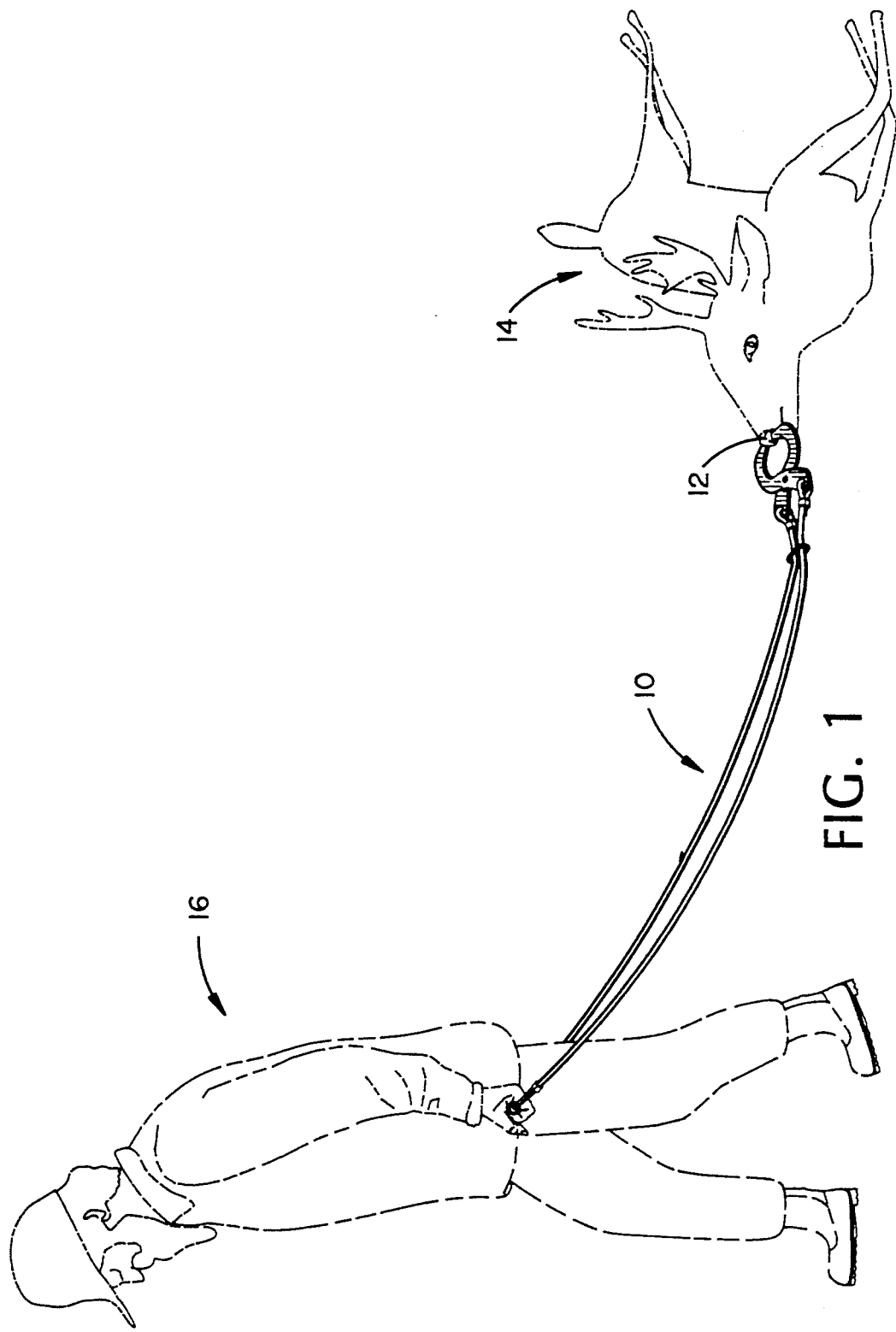
FIG. 1 is an illustration showing a game dragging device constructed according to the invention in operation.

Referring now most particularly to FIG. 1, a game dragging device 10 constructed according to the invention is there shown engaged with the nostril portion 12 of a fallen deer 14, thus enabling a hunter 16 to easily drag the deer 14 from the forest with an erect and, therefore, not uncomfortable posture.

Figure 2:
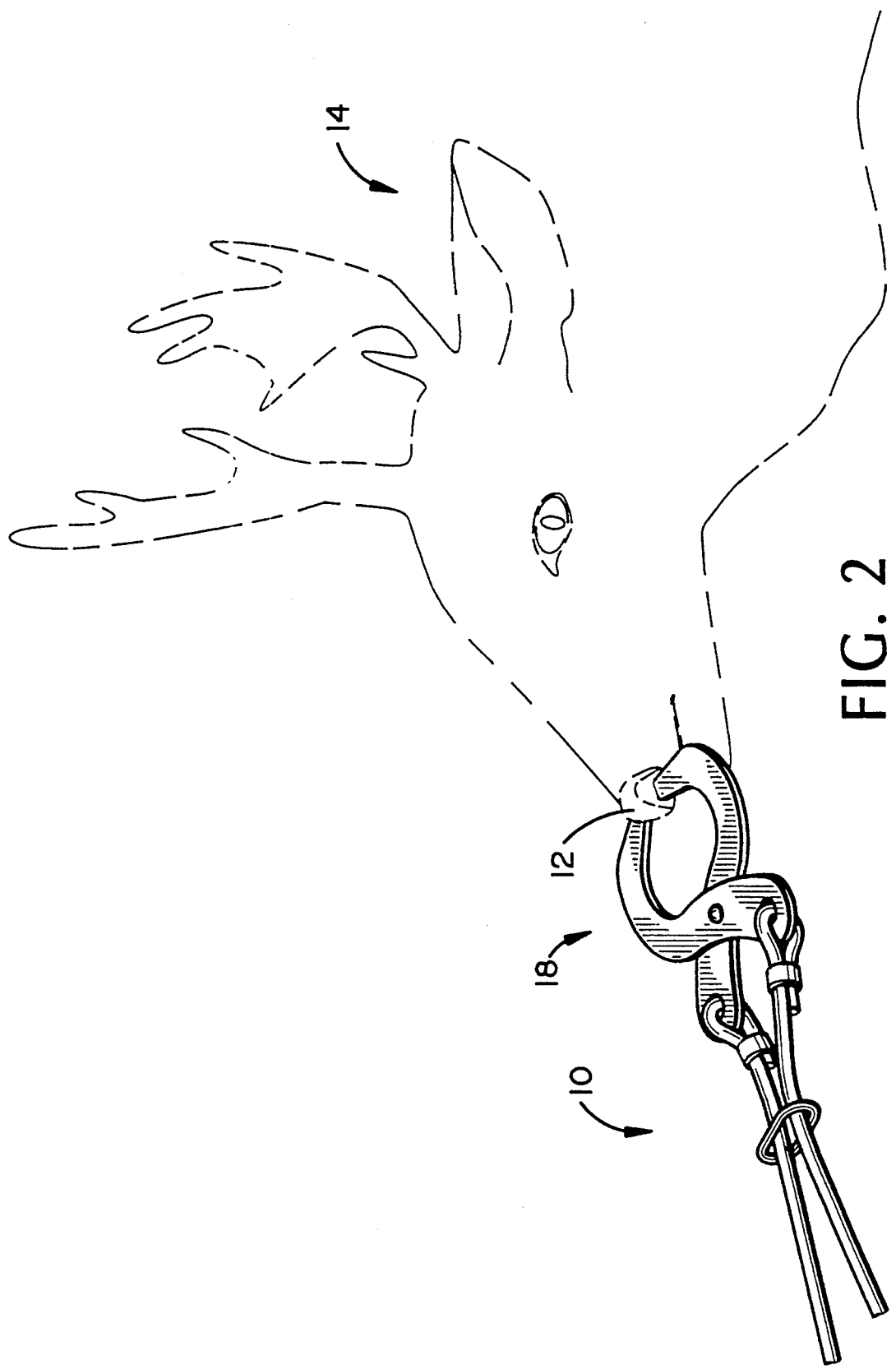
FIG. 2 is a closer illustration, showing the inventive game dragging device engaged with a fallen deer.

Referring now most particularly to FIG. 2, the game dragging device 10 includes a pair of tongs 18 that engage the bone or cartilage present in the nostril portion 12 of the fallen deer 14. Use of the game dragging device 10 is quite simple. The inside of the nostrils are slit and the ends of the tongs 18 are inserted into the slits. When a pulling force is exerted on the game dragging device 10, the ends of the tongs 18 dig into the bone or cartilage and are prevented from disengagement by the flared portions present in the nostril bone of the fallen deer 14.

Referring now most particularly to FIGS. 5 and 6, the tongs 18 generally include a pair of tong members, a first tong member 20 and a second tong member 22, each of the tong members 20 and 22 being generally S-shaped. Additionally, each of the first and second tong members 20 and 22 has a proximate (or nearer) end and a distal (or further) end, in relationship to the hunter 16. Thus, the first tong member 20 has a proximate end 24 that, in operation, is nearest to the hunter 16, and a distal end 26 that is furthest from the hunter 16. Similarly, the second tong member 22 has a proximate end 28 and a distal end 30.

The first and second tong members 20 and 22 are pivotally joined together by a pivot connection 32. The pivot connection 32 is positioned intermediate between the proximate and distal ends of both of the first and second tong members 20 and 22. Additionally, as is shown most clearly in FIG. 6, each of the distal ends 26 and 30 of the first and second tong members 20 and 22 has a V-beveled edge provided thereon. Thus, distal end 26 of tong member 20 is provided with a V-beveled edge 34, and distal end 30 of tong member 22 is provided with a V-beveled edge 36. Finally, each of the proximate ends of the tong members 20 and 22 is provided with a throughgoing hole 38 and 40, respectively.

Referring now most particularly to FIG. 3, the game dragging device 10 also includes a pair of cables (or cords, ropes, etc.) 42 and 44, each of the cables 42 and 44 having one end 46 and 47, respectively, that is attached to one each of the proximate ends 24 and 28, respectively, of the first and second tong members 20 and 22. Preferably, the cable ends 46 and 48 are attached to the proximate ends 24 and 28 via the holes 38 and 40. The cable ends 46 and 48 pass through the holes 38 and 40, loop back upon themselves, and are secured by a pair of ring clamps 50 and 52, respectively.

As is shown most clearly in FIGS. 3 and 4, the other ends 54 and 56, respectively, of the cables 42 and 44 each have a loop 58 and 60 provided thereon, the loops 58 and 60 forming grips and preferably being made by doubling the other ends 54 and 56 of the cables 42 and 44 back upon themselves and attaching the very end portions thereof to an intermediate portion of the cables 42 and 44 via ring clamps 62 and 64. Additionally, each of the loops 54 and 56 is provided with a tubular member 66 and 68 that encircles the respective cable 42 and 44 and provides for a more comfortable grip.

Finally, a slidable ring 70 encircles both of the cables 42 and 44. Once the tongs 18 have been engaged with the nostril portion 12 of the fallen deer 14, the slidable ring 70 may be slid to a location adjacent the tongs 18 to further ensure against disengagement.

Preferably, the tong members 20 and 22 are constructed from twelve gauge material, the cables 42 and 44 from nylon cord, and the tubular members 66 and 68 from polyvinylchloride pipe.

While the invention has been herein described by way of a particular preferred embodiment, various substitutions of equivalents may be effected without departing from the spirit and scope of the invention as set forth in the following claims.

What is claimed is:

1. A game dragging device for attaching to a fallen game animal to thereby facilitate the dragging of the animal, said game dragging device comprising:
- a pair of tongs for securing to the animal, said pair of tongs comprising a first tong member and a second tong member, each of said first and second tong members having a proximate end and a distal end, said first and second tong members being pivotally attached together at a point between the proximate and distal ends thereof; and
- a pair of cables, one end of each of said pair of cables being attached to one each of said proximate ends of said first and second tong members;
- wherein each of said distal ends of said first and second tong members has a V-shaped edge portion provided thereon;
- wherein each of said first and second tong members is at least partially S-shaped;
- said game dragging device additionally comprising a pair of grips, one each of said pair of grips being attached to the other end of one each of said pair of cables;
- whereby said pair of grips may be grasped by separate individuals to actuate the tong members.

2. A game dragging device according to claim 1, said game dragging device additionally comprising retainer means for retaining said proximate ends of said first and second tong members substantially together.

3. A game dragging device for attaching to a fallen game animal to thereby facilitate the dragging of the animal, said game dragging device comprising:
- a pair of tongs for securing to the animal, said pair of tongs comprising a first tong member and a second tong member, each of said first and second tong members having a proximate end and a distal end, said first and second tong members being pivotally attached together at a point between the proximate and distal ends thereof; and
- a pair of cables, one end of each of said pair of cables being attached to one of each of said proximate ends of said first and second tong members;
- wherein each of said distal ends of said first and second tong members has a V-shaped edge portion provided thereon;
- wherein each of said first and second tong members is at least partially S-shaped;
- said game dragging device additionally comprising a pair of grips, one each of said pair of grips attached to the other end of one each of said pair of cables;
- said game dragging device additionally comprising retainer means for retaining said proximate ends of said first and second tong members substantially together;
- wherein said retainer means comprises a ring member, said ring member encircling both of said cables and being slidable thereon.

4. A game dragging device according to claim 3, wherein each of said grips comprises a loop formed at each said other end of each of said cables, a tubular member encircling each of said cables within each of said loops, and a clamping ring clamping each said other end of each of said cables to thereby form said loops.

5. A game dragging device according to claim 4, wherein each of said proximate ends of said first and second tong members is provided with a thoroughgoing hole, each said one end of said cables passing through one each of said throughgoing holes.

6. A game dragging device according to claim 5, wherein each said one end of said cables comprises an additional loop and an additional clamping ring forming said additional loop, one each of said additional loops passing through one each of said throughgoing holes.

7. A game dragging device according to claim 6, wherein said cables comprise nylon cord, and wherein each of said tubular members comprises polyvinylchloride pipe.

8. A game dragging device for attaching to a fallen game animal to thereby facilitate the dragging of the animal, said game dragging device comprising:
- a pair of tongs for securing to the animal, said pair of tongs comprising a first tong member and a second tong member, each of said first and second tong members having a proximate end and a distal end, said first and second tong members being pivotally attached together at a point between the proximate and distal ends thereof;
- a pair of cables, one end of each of said pair of cables being attached to one each of said proximate ends of said first and second tong members;
- each of said distal ends of said first and second tong members having a V-shaped edge portion provided thereon;
- each of said first and second tong members being at least partially S-shaped;
- a ring member encircling both of said pair of cables, said ring member being slidable along said pair of cables to a point adjacent said pair of tongs; and
- a pair of grips, one each of said pair of grips being attached to the other end of one each of said pair of cables;
- each of said grips comprising a loop formed at each said other end of each of said cables, a tubular member encircling each of said cables within each of said loops, and a clamping ring clamping each said other end of each of said cables to thereby form said loops; and
- each of said proximate ends of said first and second tong members being provided with a thoroughgoing hole, each said one end of said cables passing through one each of said throughgoing holes.

9. A game dragging device according to claim 8, wherein each of said one end of said cables comprises an additional loop and an additional clamping ring forming said additional loop, one each of said additional loops passing through one each of said throughgoing holes.

10. A game dragging device according to claim 9, wherein said cables comprise nylon cord, and wherein each of said tubular members comprises polyvinylchloride pipe.

* * * * *